(12) United States Patent
Chen (10) Patent No.: US 10,569,409 B2
(45) Date of Patent: Feb. 25, 2020

(54) HAND TOOL

(71) Applicant: Shou-Hung Chen, Taichung (TW)

(72) Inventor: Shou-Hung Chen, Taichung (TW)

( * ) Notice: Subject to any disclaimer, the term of this patent is extended or adjusted under 35 U.S.C. 154(b) by 252 days.

(21) Appl. No.: 15/851,669

(22) Filed: Dec. 21, 2017

(65) Prior Publication Data

US 2019/0193256 A1    Jun. 27, 2019

(51) Int. Cl.
| | | |
|---|---|---|
| *A47L 13/022* | (2006.01) | |
| *B25G 3/04* | (2006.01) | |
| *B25G 3/14* | (2006.01) | |
| *B25G 1/10* | (2006.01) | |
| *B29C 49/64* | (2006.01) | |
| *B29C 49/20* | (2006.01) | |
| *B08B 1/00* | (2006.01) | |
| *B29L 31/28* | (2006.01) | |
| *B29C 49/42* | (2006.01) | |

(52) U.S. Cl.
CPC ............ *B25G 1/102* (2013.01); *A47L 13/022* (2013.01); *B25G 3/04* (2013.01); *B25G 3/14* (2013.01); *B29C 49/20* (2013.01); *B29C 49/64* (2013.01); *B08B 1/005* (2013.01); *B29C 49/4273* (2013.01); *B29L 2031/283* (2013.01)

(58) Field of Classification Search
CPC ....... A47L 13/02; A47L 13/022; B25G 1/102; B25G 3/04; B25G 3/08; B25G 3/14; B08B 1/005; B29L 2031/283
USPC ...................... 15/143.1, 236.01; 30/169, 172
See application file for complete search history.

(56) References Cited

U.S. PATENT DOCUMENTS

| | | | |
|---|---|---|---|
| 10,449,576 B1 * | 10/2019 | Rotanelli | ................ B08B 1/005 |
| 2002/0104182 A1 * | 8/2002 | Panfili | ...................... B25G 1/00 |
| | | | 15/236.01 |
| 2016/0324060 A1 * | 11/2016 | Pope | ...................... B26B 11/00 |

* cited by examiner

*Primary Examiner* — Randall E Chin (57) ABSTRACT

A hand tool includes a handle and a connection portion which is connected to the handle. The handle is a hollow handle and has a space defined therein. The connection portion includes a slit. A blade has a body and a toothed portion which is inserted into the slit of the connection portion when the handle and the connection portion are connected to each other by way of blow molding. A cooling material is located in the space of the handle. The temperature of the cooling material is the same as the temperature of the handle and the connection portion during blow molding. The cooling material contacts the inside of the handle to cool down the handle. The cooling material performing as a weight in the handle 2.

2 Claims, 8 Drawing Sheets

HAND TOOL

BACKGROUND OF THE INVENTION

1. Fields of the Invention

The present invention relates to a hand tool, and more particularly, to a hand tool with a weight received in the handle.

2. Descriptions of Related Art

The conventional hand tool such as a trowel known to applicant generally comprises a plastic handle and a blade is connected to one end of the handle. The handle usually is designed as a solid plastic handle which is made by way of plastic injection molding. However, the solid handle requires a longer cooling time after being connected with the blade. The longer cooling time means higher manufacturing cost. Besides, the solid handle requires more material when compared with a hollow handle. Furthermore, the molding unit is submerged into water so as to accelerate the cooling process, nevertheless, the blade may get rusting due to the water.

Another hand tool known to applicant comprises a handle with a connection portion which is connected to the handle and has a slit, and the blade is inserted into the slit. The handle and the connection portion are connected to each other by way of blow molding, plastic injection molding or ultra-sonic welding. This hand tool eliminates the shortcomings mentioned above by reducing cooling time and material required. However, the hollow handle may be broken because the high temperature within the interior of the handle is not easily removed.

The present invention intends to provide a hand tool that requires short cooling time and introduces a weight in the handle to eliminate the shortcomings mentioned above.

SUMMARY OF THE INVENTION

The present invention relates to a hand tool and comprises a handle having a connection portion which includes a slit defined in one end thereof. The handle and the connection portion are connected to each other by way of blow molding. The handle is a hollow handle and has a space defined therein. A cooling material is located in the space of the handle, wherein the temperature of the cooling material is the same as the temperature of the handle and the connection portion during blow molding. A blade has a body and a toothed portion. The toothed portion is inserted into the slit of the connection portion when the handle and the connection portion are connected to each other by way of blow molding. A clamping unit clamps the connection portion to secure the connection between the connection portion and the toothed portion. The cooling material contacts the inside of the handle to cool down the handle, and the clamping unit is then removed after the handle is cooled so that the connection portion of the handle is connected to the toothed portion of the blade. The cooling material performs as a weight in the handle.

The present invention also provide another hand tool which comprises a handle which is made by way of blow molding so as to be a hollow handle which has a space defined therein. A connection portion is made by way of blow molding and has a slit defined in the first end thereof. A cooling material is located in the space of the handle. The temperature of the cooling material is the same as the temperature of the handle and the connection portion during blow molding. The connection portion has at least one rib extending inward from the inside of the second end thereof. The handle has a tubular portion extending from one end thereof, and a protrusion extends outward from outside of the tubular portion. The tubular portion is inserted into the second end of the connection portion, and the at least one rib is engaged with the protrusion. A blade has a body and a toothed portion. The toothed portion is inserted into the slit of the connection portion. The cooling material contacts the inside of the handle to cool down the handle. The connection portion of the handle is connected to the toothed portion of the blade. The cooling material performs as a weight in the handle.

The present invention provides yet provide another hand tool which comprises a handle that is made by way of blow molding so as to be a hollow handle which has a space defined therein. A reception room is defined in one end of the handle and an engaging portion is formed in the inside of the reception room. A connection portion is made by way of blow molding and has a slit defined in the first end thereof. At least one rib extends axially from the second end of the connection portion. A cooling material is located in the space of the handle. The temperature of the cooling material is the same as the temperature of the handle and the connection portion during blow molding. The second end of the connection portion is inserted into the reception room of the handle. The at least one rib of the connection portion is engaged with the engaging portion in the reception room of the handle. A blade has a body and a toothed portion, wherein the toothed portion is inserted into the slit of the connection portion. The cooling material contacts the inside of the handle to cool down the handle. The connection portion of the handle is connected to the toothed portion of the blade. The cooling material performs as a weight in the handle.

The cooling material quickly cools the temperature of the handle so that the handle does not need a long time for cooling down.

The cooling material performs as a weight in the handle so that the users maneuver the hand tool more comfortably and easily.

The cooling material also strengthen the structural strength of the handle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the hand tool 100 of the present invention comprises a handle 2 having a connection portion 1 connected thereto. The handle 2 and the connection portion 1 are connected to each other by way of blow molding. The handle 2 is a hollow handle and has a space 27 defined therein. The connection portion 1 includes a slit 13 defined in one end thereof. A blade 3 includes a body 31 and a toothed portion 32, wherein the toothed portion 32 is inserted into the slit 13 of the connection portion 1 when the handle 2 and the connection portion 1 are connected to each other by way of blow molding. A clamping unit (not shown) is used to clamp the connection portion 1 to secure the connection between the connection portion 1 and the toothed portion 32. A cooling material 4 is located in the space 27 of the handle 2, and the temperature of the cooling material 4 is the same as the temperature of the handle 2 and the connection portion 1 during blow molding.

The cooling material 4 contacts the inside of the handle 2 to cool down the handle 2, and the clamping unit is then removed after the handle 2 is cooled so that the connection portion 1 of the handle 2 is connected to the toothed portion 32 of the blade 3. The cooling material 4 performs as a weight in the handle 2. The cooling material is water, oil, steel balls or sand.

Figure 1:
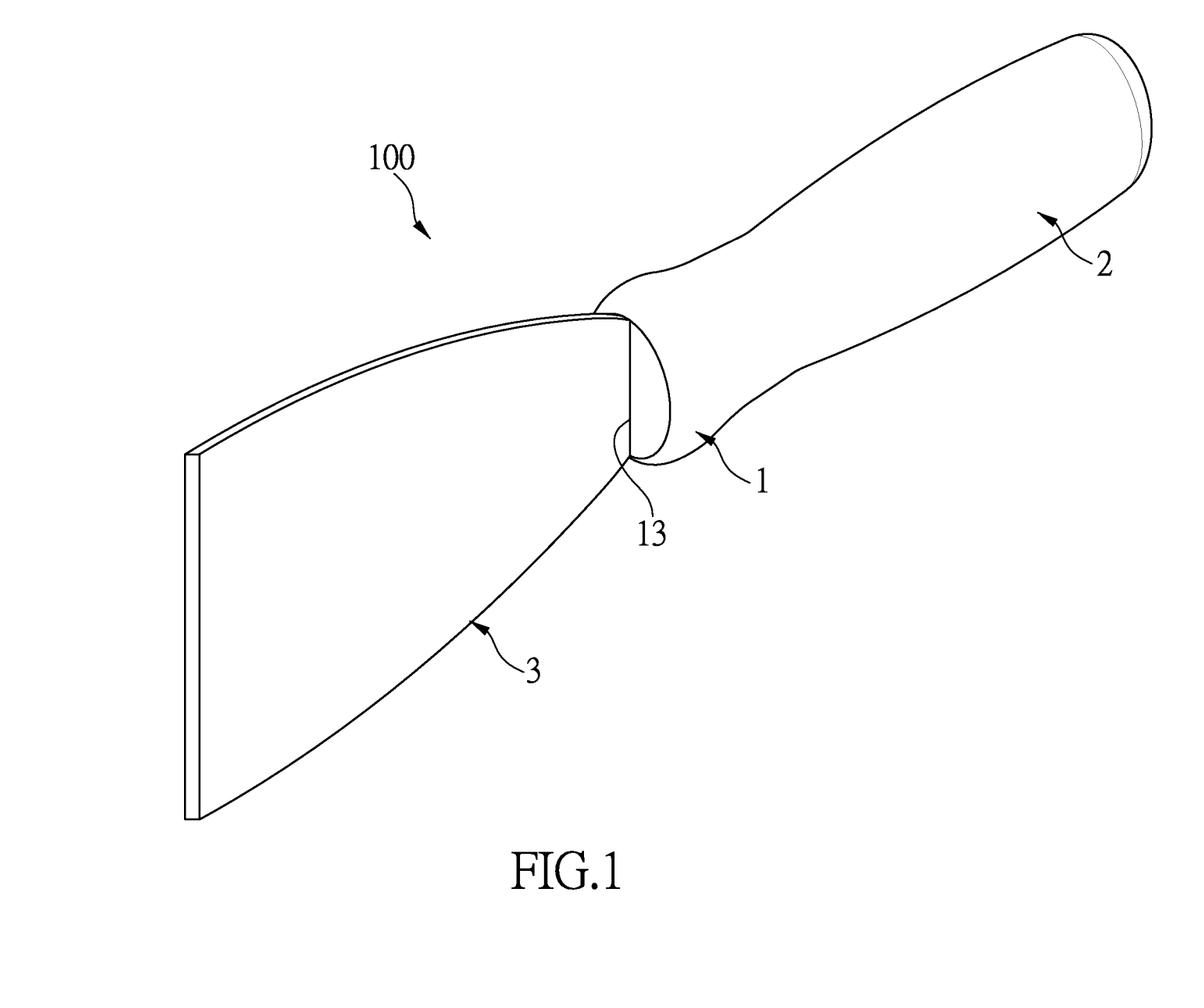
FIG. 1 is a perspective view to show the hand tool of the present invention.
Figure 2:
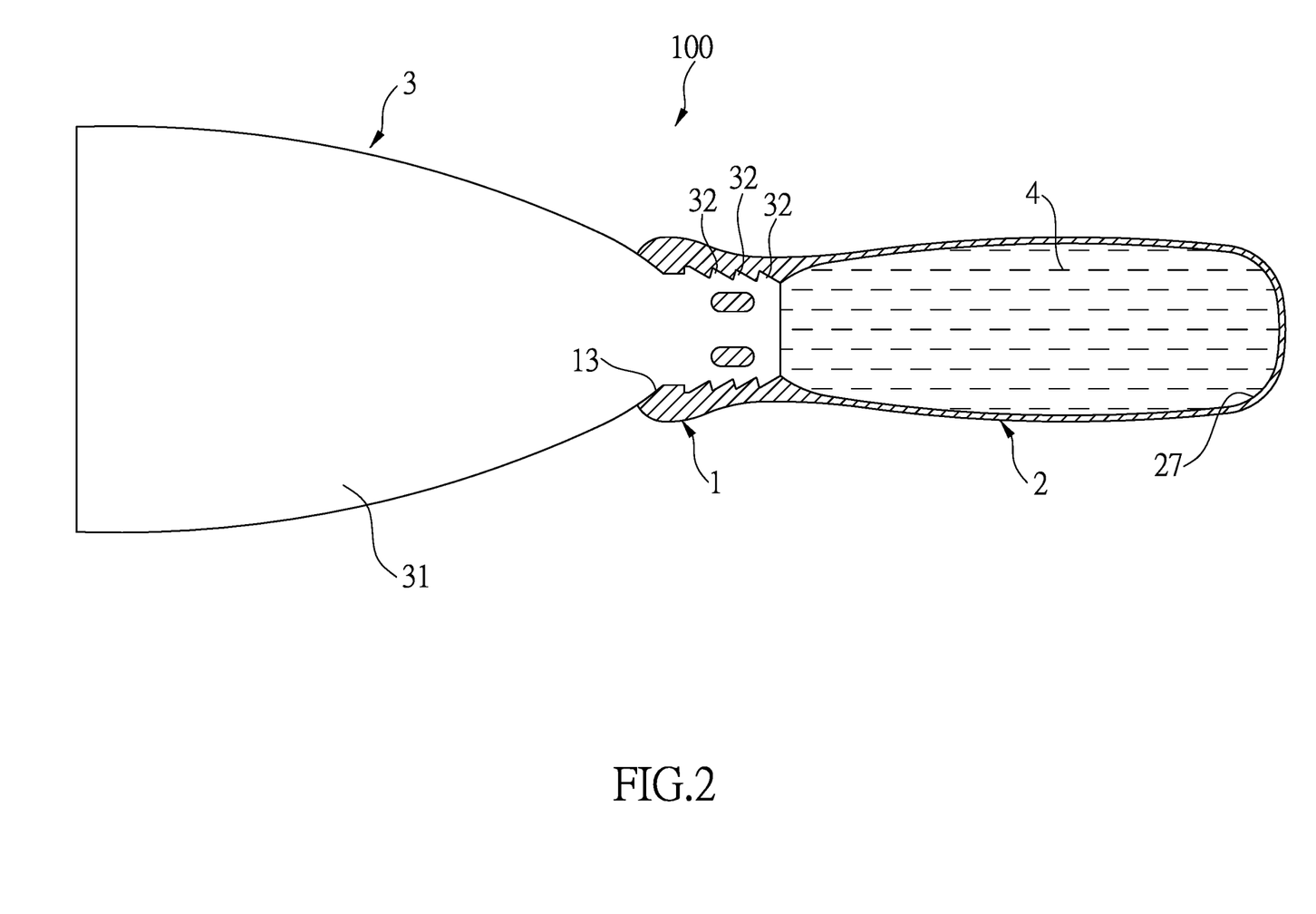
FIG. 2 is a cross sectional view of the hand tool of the present invention.
Figure 3:
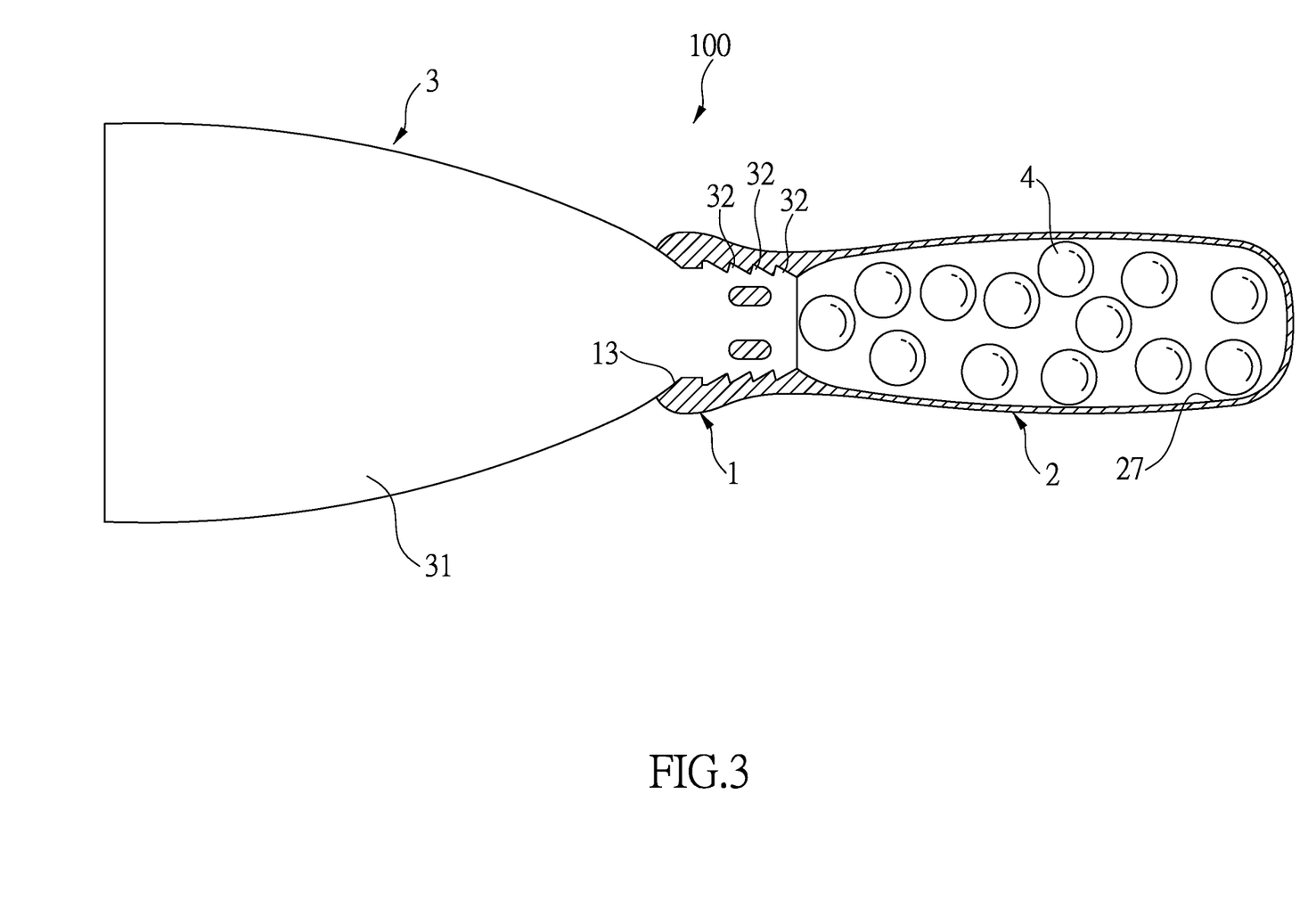
FIG. 3 shows that, steel balls as the cooling material, are located in the handle of the hand tool of the present invention.
Figure 4:
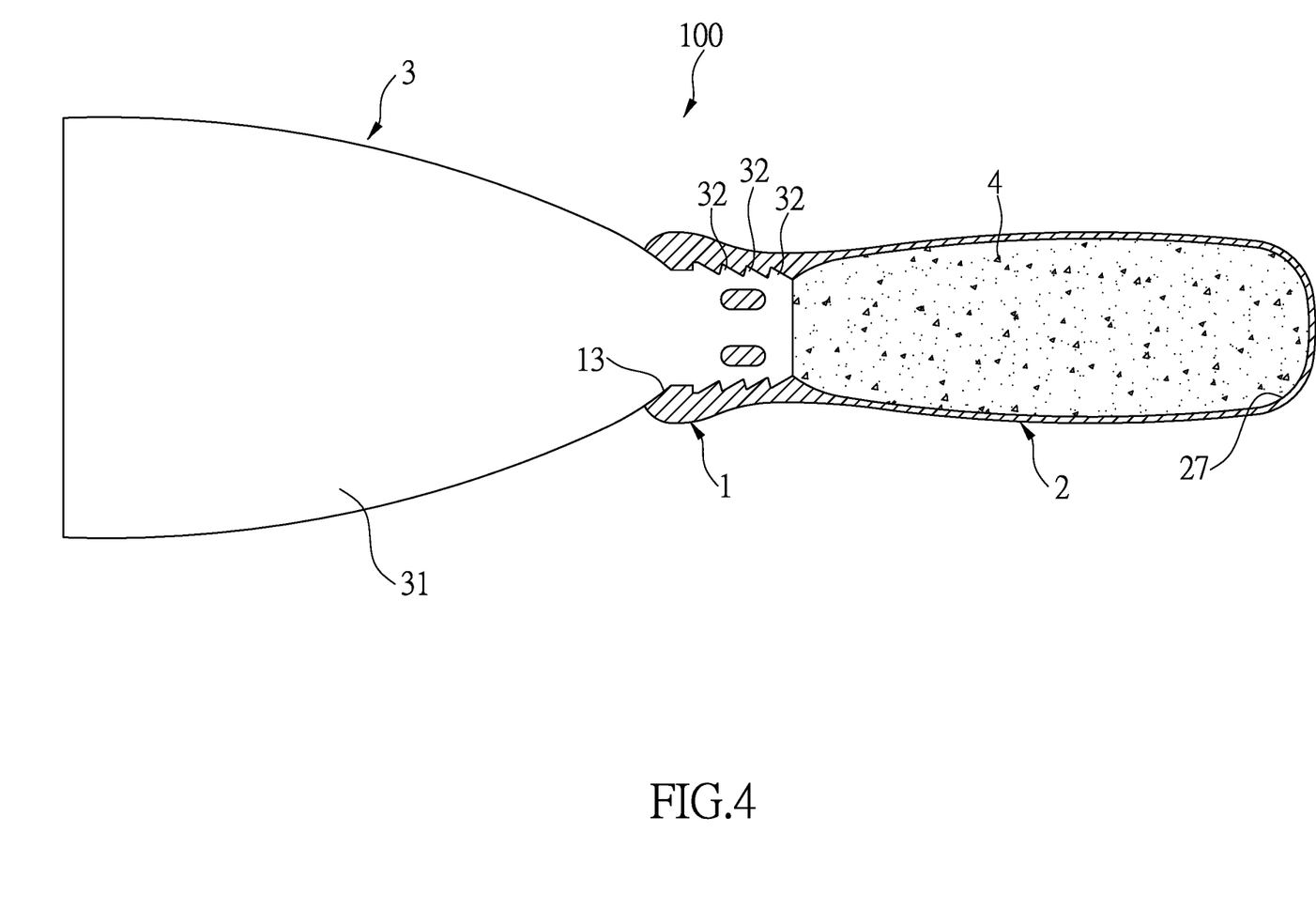
FIG. 4 shows that, sand as the cooling material, is located in the handle of the hand tool of the present invention.
Figure 5:
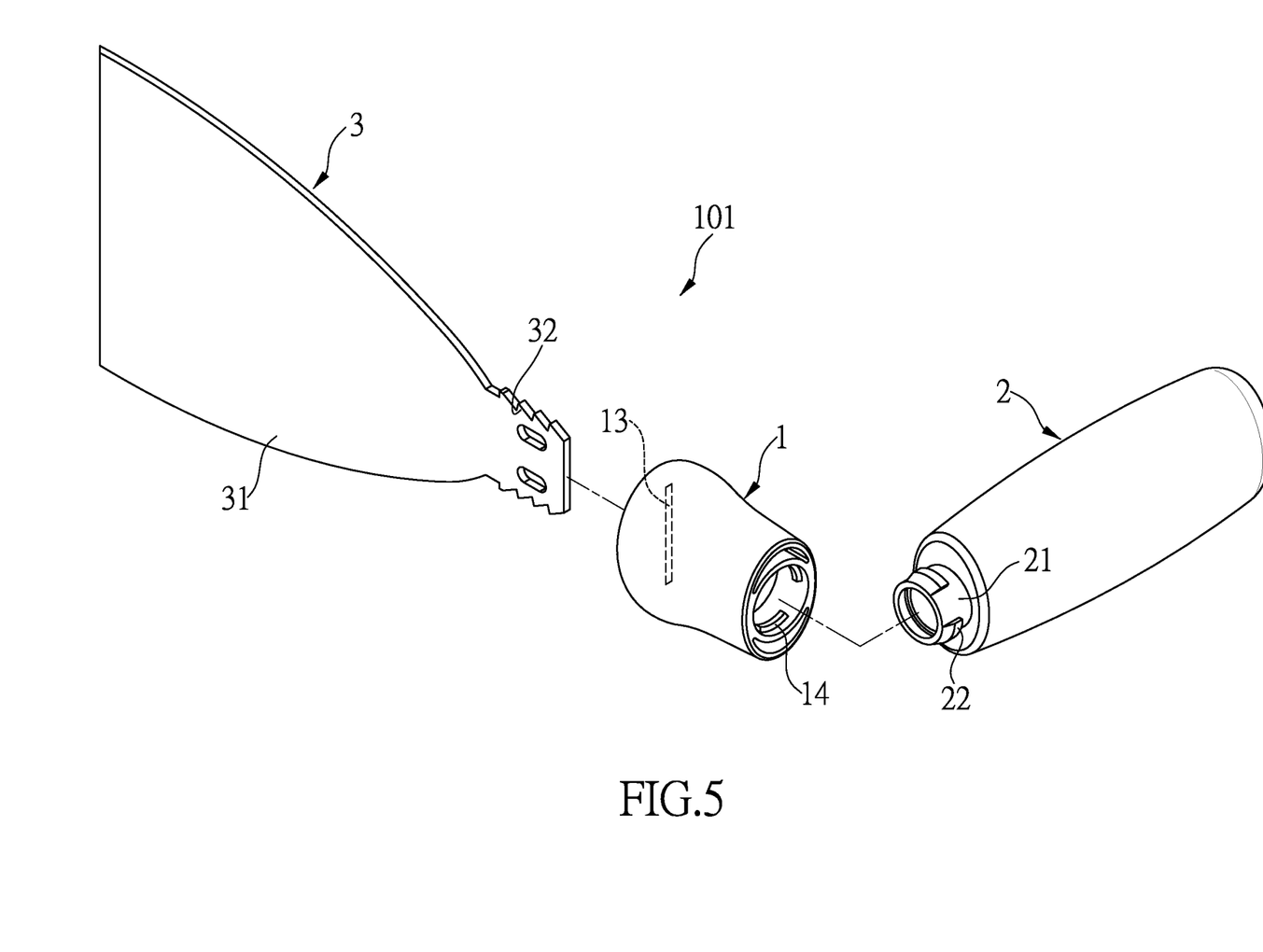
FIG. 5 is an exploded view to show the second embodiment of the hand tool of the present invention.
Figure 6:
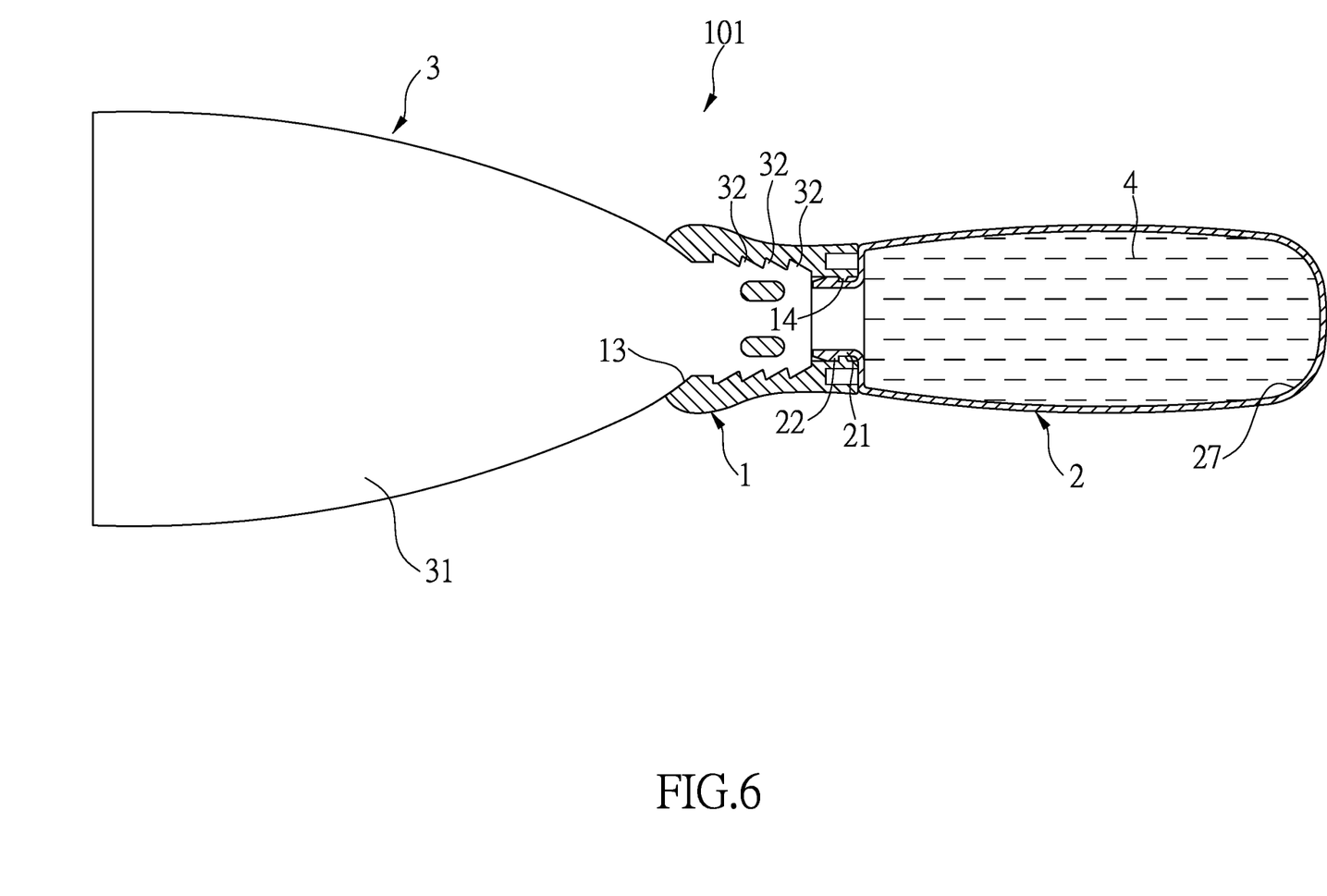
FIG. 6 is a cross sectional view of the second embodiment of the hand tool of the present invention.

FIGS. 5 and 6 show the second embodiment of the present invention, wherein the hand tool 101 comprises a handle 2 which is made by way of blow molding so as to be a hollow handle which has a space 27 defined therein. A connection portion 1 is made by way of blow molding and has a slit 13 defined in the first end thereof. The connection portion 1 has at least one rib 14 extending inward from the inside of the second end thereof. In this embodiment, there are two ribs 14. The handle 2 has a tubular portion 21 extending from one end thereof, and a protrusion 22 extends outward from outside of the tubular portion 21. The tubular portion 21 is inserted into the second end of the connection portion 1, and the at least one rib 14 is engaged with the protrusion 22. A blade 3 has a body 31 and a toothed portion 32, wherein the toothed portion 32 is inserted into the slit 13 of the connection portion 1. Each of the teeth of the toothed portion 32 includes an inclined side which allows the toothed portion 32 to be easily inserted into the slit 13 and can be engaged with the inside of the slit 13. A cooling material 4 is located in the space 27 of the handle 2. The temperature of the cooling material 4 is the same as the temperature of the handle 2 and the connection portion 1 during blow molding. The cooling material 4 contacts the inside of the handle 2 to cool down the handle 2. The connection portion 1 of the handle 2 is connected to the toothed portion 32 of the blade 3. The blade 3 is firmly connected to the connection portion 1 so that the blade 3 is not separated from the connection portion 1. The cooling material 4 performs as a weight in the handle 2. The cooling material is water, oil, steel balls or sand.

Figure 7:
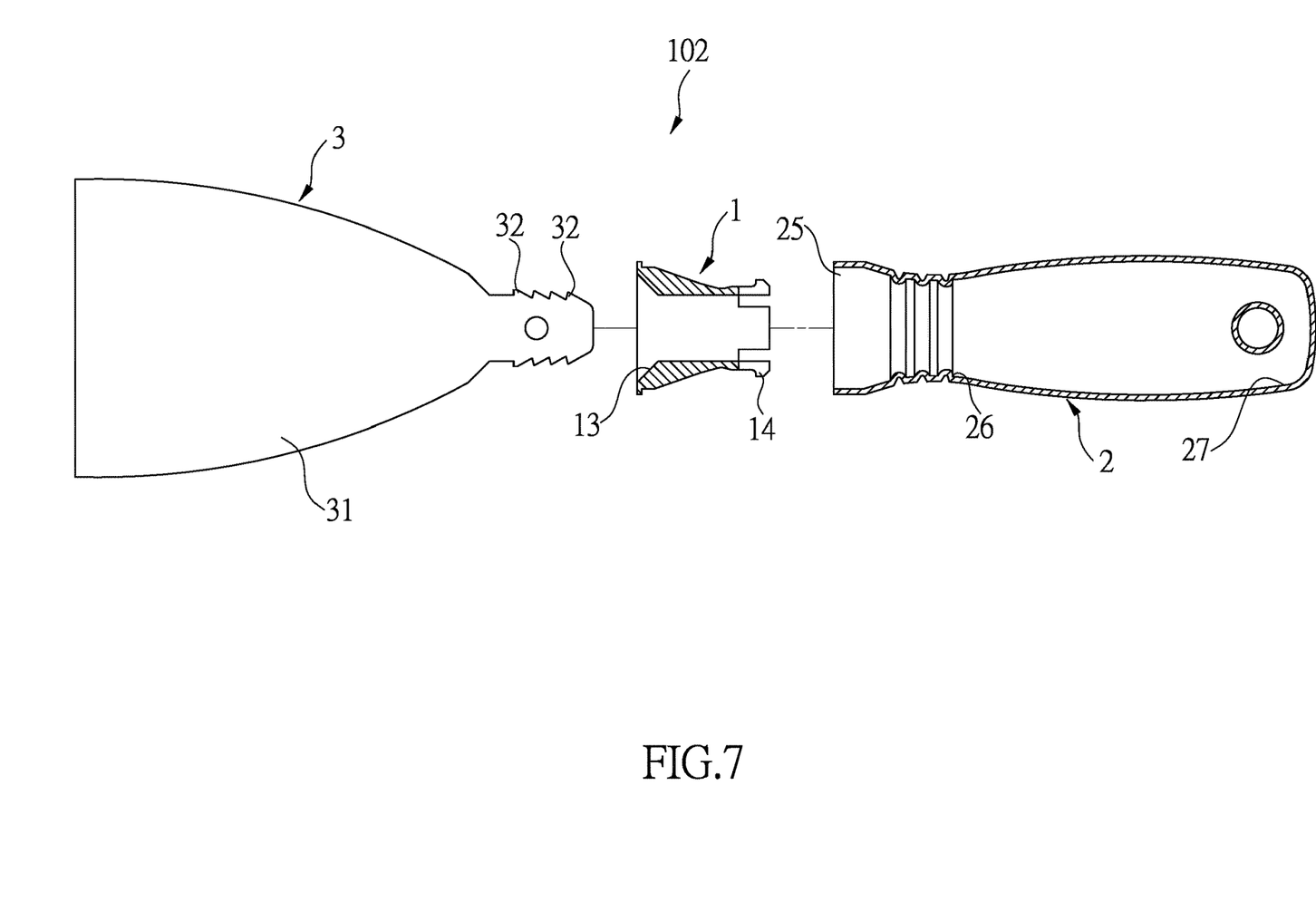
FIG. 7 is an exploded view to show the third embodiment of the hand tool of the present invention.
Figure 8:
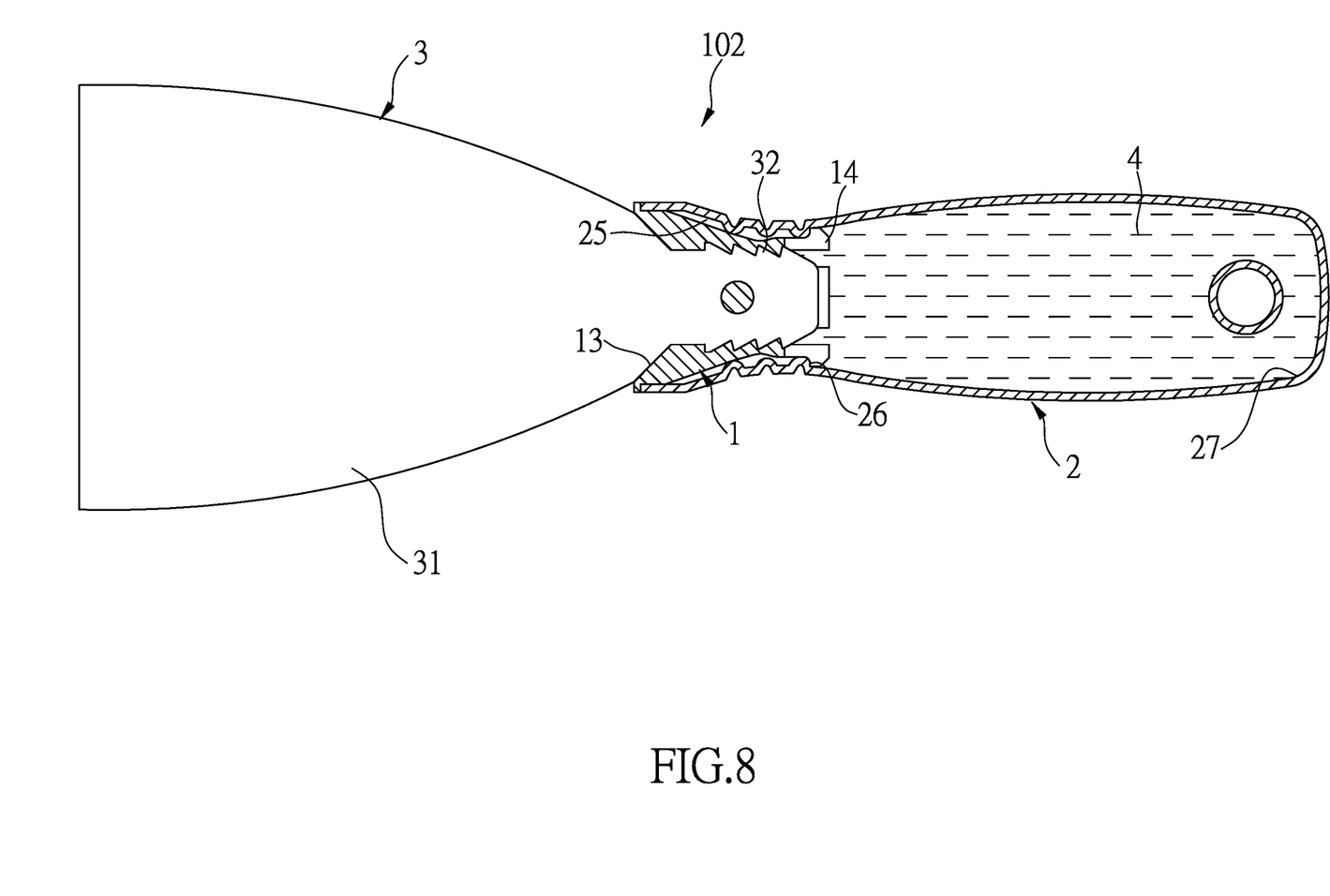
FIG. 8 is a cross sectional view of the third embodiment of the hand tool of the present invention.

FIGS. 7 and 8 show the third embodiment of the present invention, wherein the hand tool 102 comprises a handle 2 which is made by way of blow molding and is a hollow handle with a space 27 defined therein. A reception room 25 is defined in one end of the handle 2 and opens through the end of the handle 2. An engaging portion 26 is formed in the inside of the reception room 25. The engaging portion 26 is in a form of multiple ridges. A connection portion 1 is made by way of blow molding and has a slit 13 defined in the first end thereof. At least one rib 14 extends axially from the second end of the connection portion 1. In this embodiment, there are two ribs 14 and each rib 14 includes a hook end.

The second end of the connection portion 1 is inserted into the reception room 25 of the handle 2, and the at least one rib 14 of the connection portion 1 is engaged with the engaging portion 26 in the reception room 25 of the handle 2. A blade 3 has a body 31 and a toothed portion 32. The toothed portion 32 is inserted into the slit 13 of the connection portion 1. A cooling material 4 is located in the space 27 of the handle 2. The temperature of the cooling material 4 is the same as the temperature of the handle 2 and the connection portion 1 during blow molding. The cooling material 4 contacts the inside of the handle 2 to cool down the handle 2. The connection portion 1 of the handle 2 is connected to the toothed portion 32 of the blade 3. The cooling material 4 performs as a weight in the handle 2. The cooling material is water, oil, steel balls or sand.

The cooling material 4 quickly cools the temperature of the handle 2 so that the handle 2 does not need a long time for cooling down. The cooling material 4 performs as a weight in the handle 2 so that the users maneuver the hand tool more comfortably and easily. Furthermore, the cooling material 4 also strengthen the structural strength of the handle 2.

While we have shown and described the embodiment in accordance with the present invention, it should be clear to those skilled in the art that further embodiments may be made without departing from the scope of the present invention.

What is claimed is:
1. A hand tool comprising:
   a handle having a connection portion which includes a slit defined in one end thereof, the handle and the connection portion connected to each other by way of blow molding, the handle being a hollow handle and having a space defined therein;
   a blade having a body and a toothed portion, the toothed portion inserted into the slit of the connection portion when the handle and the connection portion are connected to each other by way of blow molding, a clamping unit clamping the connection portion to secure connection between the connection portion and the toothed portion, and
   a cooling material located in the space of the handle, a temperature of the cooling material being the same as a temperature of the handle and the connection portion during blow molding, the cooling material contacting an inside of the handle to cool down the handle, and the clamping unit being removed after the handle is cooled so that the connection portion of the handle is connected to the toothed portion of the blade, the cooling material performing as a weight in the handle.
2. The hand tool as claimed in claim 1, wherein the cooling material is water, oil, steel balls or sand.

* * * * *